US010797936B2

(12) United States Patent
Kunz et al.

(10) Patent No.: US 10,797,936 B2
(45) Date of Patent: *Oct. 6, 2020

(54) METHODS AND APPARATUSES FOR FACILITATING P-CSCF RESTORATION WHEN A P-CSCF FAILURE HAS OCCURRED

(71) Applicant: NEC Corporation, Tokyo (JP)

(72) Inventors: Andreas Kunz, Heidelberg (DE);
Gottfried Punz, Heidelberg (DE);
Genadi Velev, Heidelberg (DE);
Toshiyuki Tamura, Heidelberg (DE)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/169,907

(22) Filed: Oct. 24, 2018

(65) Prior Publication Data

US 2019/0123954 A1  Apr. 25, 2019

Related U.S. Application Data

(63) Continuation of application No. 15/023,803, filed as application No. PCT/GB2014/052906 on Sep. 24, 2014, now Pat. No. 10,148,487.

(30) Foreign Application Priority Data

Sep. 24, 2013  (EP) .................................... 13185705

(51) Int. Cl.
*H04W 76/19* (2018.01)
*H04W 76/32* (2018.01)
(Continued)

(52) U.S. Cl.
CPC ............ *H04L 41/06* (2013.01); *H04L 65/105* (2013.01); *H04L 65/1006* (2013.01);
(Continued)

(58) Field of Classification Search
CPC ...... H04L 12/54; H04L 29/06; H04W 76/028; H04W 8/22
See application file for complete search history.

(56) References Cited

U.S. PATENT DOCUMENTS

2007/0275710 A1  11/2007  Mayer et al.
2008/0175157 A1   7/2008  Lim et al.
(Continued)

FOREIGN PATENT DOCUMENTS

CN  1773934 A   5/2006
CN  1871831 A  11/2006
(Continued)

OTHER PUBLICATIONS

3GPP TR 23.820 v9.0.0 (Sep. 2009) 3$^{rd}$ Generation Partnership Project; Technical Specification Group Core Network and Terminals; Study on IMS Restoration Procedures (Release 9).
(Continued)

*Primary Examiner* — Iqbal Zaidi
(74) *Attorney, Agent, or Firm* — Finnegan, Henderson, Farabow, Garrett & Dunner, L.L.P.

(57) ABSTRACT

A method of facilitating P-CSCF restoration when a P-CSCF failure has occurred is disclosed. The method comprises a Proxy Call Session Control Function, 'P-CSCF' receiving a Session Initiation Protocol, 'SIP', message when said P-CSCF has been selected as a alternative P-CSCF to a failed P-CSCF and providing to an associated Policy and Charging Rules Function, 'PCRF', a message comprising to indication that P-CSCF restoration is required.

10 Claims, 6 Drawing Sheets

Attach Procedure

(51) Int. Cl.
*H04W 76/12* (2018.01)
*H04L 12/24* (2006.01)
*H04L 29/06* (2006.01)
*H04L 29/14* (2006.01)

(52) U.S. Cl.
CPC ...... *H04L 65/1016* (2013.01); *H04L 65/1073* (2013.01); *H04L 69/40* (2013.01); *H04W 76/19* (2018.02); *H04W 76/12* (2018.02); *H04W 76/32* (2018.02)

(56) References Cited

U.S. PATENT DOCUMENTS

| | | | |
|---|---|---|---|
| 2010/0177767 | A1 | 7/2010 | Ishii |
| 2010/0262699 | A1* | 10/2010 | Bakker ............... H04L 65/1073 709/227 |
| 2010/0287406 | A1 | 11/2010 | Ishii |
| 2011/0128843 | A1 | 6/2011 | Przybysz et al. |
| 2013/0010804 | A1 | 1/2013 | Fernandez Alonso et al. |
| 2013/0044608 | A1 | 2/2013 | Qiang et al. |
| 2013/0194910 | A1 | 8/2013 | Przybysz et al. |
| 2015/0055446 | A1* | 2/2015 | Avula ................. H04W 56/002 370/216 |
| 2015/0121123 | A1 | 4/2015 | Bath et al. |
| 2015/0124588 | A1* | 5/2015 | Hallenstal ........... H04L 65/1016 370/221 |

FOREIGN PATENT DOCUMENTS

| | | |
|---|---|---|
| CN | 101217407 A | 7/2008 |
| CN | 101489242 A | 7/2009 |
| CN | 102138312 A | 7/2011 |
| CN | 102316435 A | 1/2012 |
| CN | 101741822 A | 6/2012 |
| CN | 103441862 A | 12/2013 |
| CN | 104247374 A | 12/2014 |
| JP | WO 2008/123562 A1 | 10/2008 |
| JP | 2009182541 A | 8/2009 |
| WO | WO 2009/039890 A1 | 4/2009 |
| WO | WO 2011/131240 A1 | 10/2011 |

OTHER PUBLICATIONS

First Office Action dated Jul. 4, 2018, issued by the State Intellectual Property Office of The Peoples Republic of China in counterpart Chinese Patent Application No. 201480052360.4.
Notification of Reasons for Refusal dated Jun. 27, 2018, issued by the Japanese Patent Office in counterpart Japanese Patent Application No. 2016-515479.
First Office Action dated Jul. 23, 2018, issued by the State Inteiiectual Property Office of The Peoples Republic of China in counterpart Chinese Patent Application No. 201480052361.9.
NEC, "New alternative for P-CSCF failure", 3 GPP TSG CT WG4 Meeting #62bis,C4-131604, Oct. 2013.
Notification of Transmittal, International Preliminary Report on Patentability, and Written Opinion dated Apr. 7, 2016, in counterpart International Application No. PCT/GB2014/052906.
3GPP TS 23.228, V11.9,0, $3^{rd}$ Generation Partnership Project; Technical Specification Group Services and System Aspects; IP Multimedia Subsystem ((IMS); Stage 2 (Release 11), Sep. 2013.
3GPP TS 23.228, V12.2.0, $3^{rd}$ Generation Partnership Project; Technical Specification Group Services and System Aspects; IP Multimedia Subsystem ((IMS); Stage 2 (Release 12), Sep. 2013.
3GPP TS 23.401, V11.7.0, $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 11), Sep. 2013.
3GPP TS 23.401, V12.2.0, $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), Sep. 2013.
"Enhanced P-CSCF Restoration Procedures", 3GPP TSG CT WG4 Meeting #61, C4-131277, URL:http://www.3gpp.org/ftp/tsg_ct/WG4_protocollars_ex-CN4/TSGCT4_62_Vienna/Docs/, Aug. 2013.
3GPP TS 23.380, V11.1.0, $3^{rd}$ Generation Partnership Project; Technical Specification Group Core Network and Terminals; IMS Restoration Procedures (Release 11), pp. 1-17, Dec. 2012.
International Search Report and Written Opinion dated Jan. 21, 2015, in corresponding PCT International Application.
Office Action dated Sep. 16, 2019, by the Indian Patent Office in counterpart Indian Patent Application No. 201617005738.

* cited by examiner

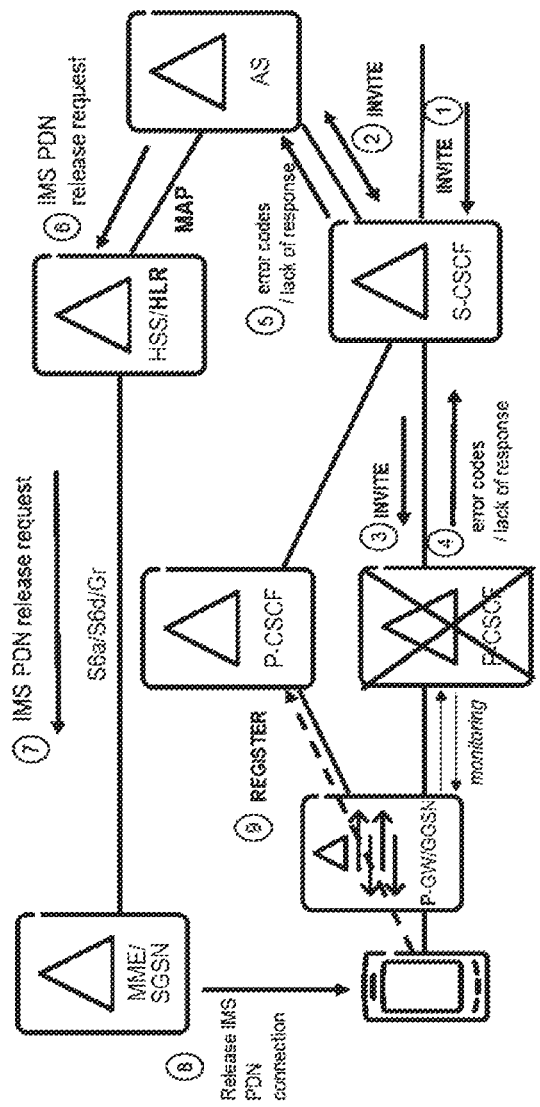
Fig. 1: Solution Proposal from C4-131277

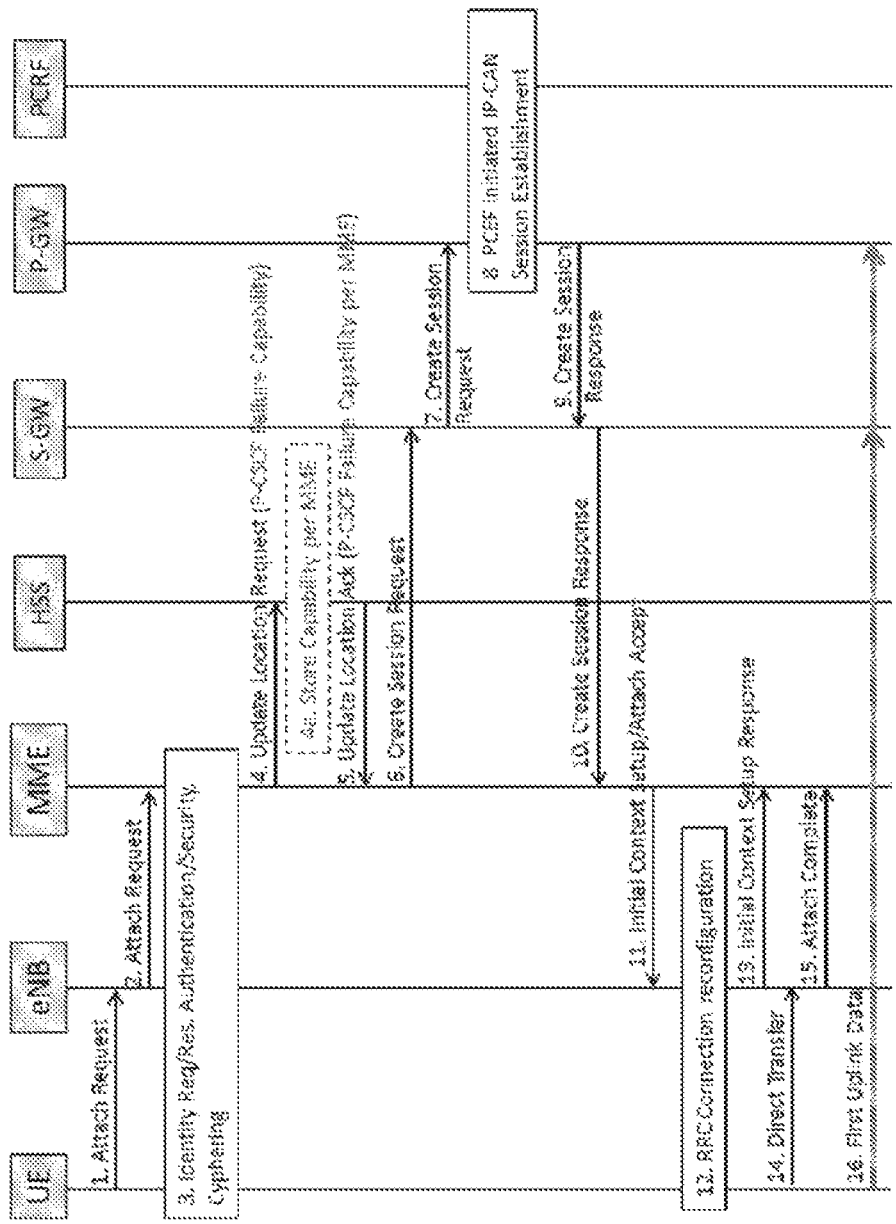
Fig. 2: Attach Procedure

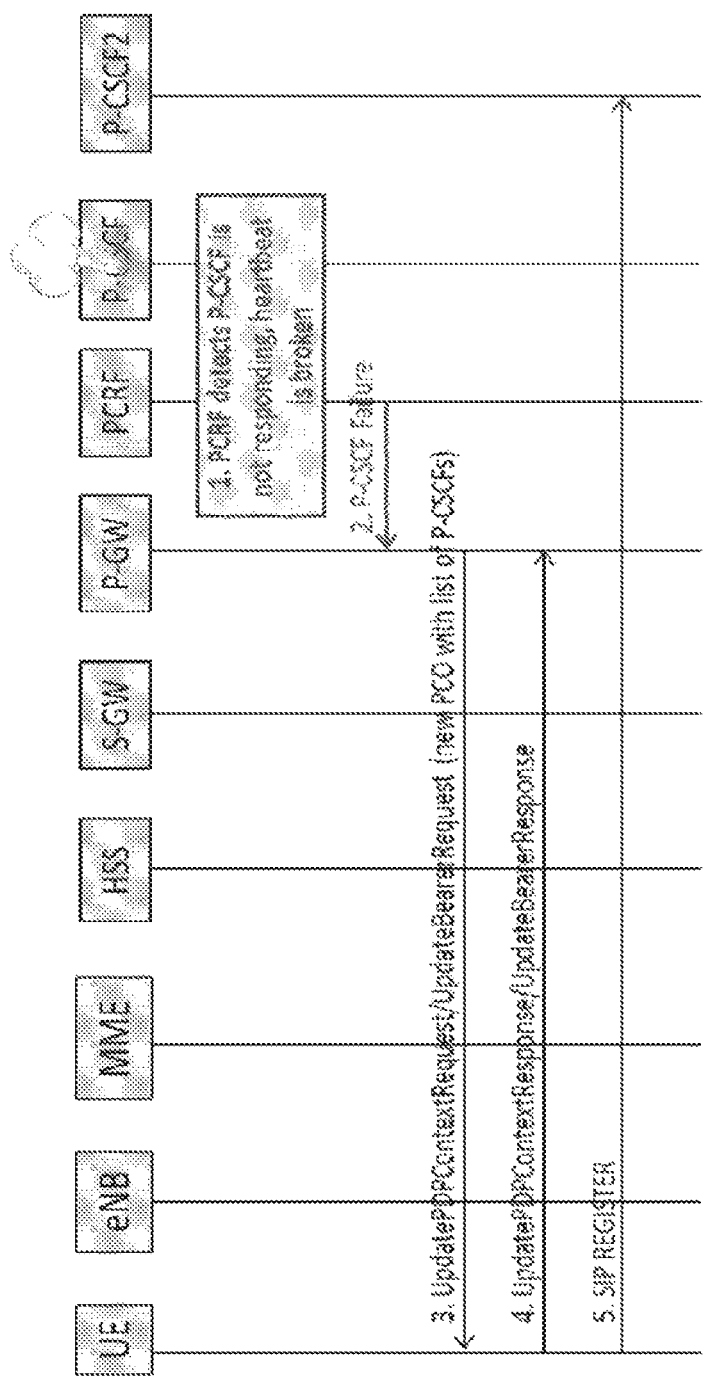
Fig. 3: P-CSCF Failure Detection by PCRF

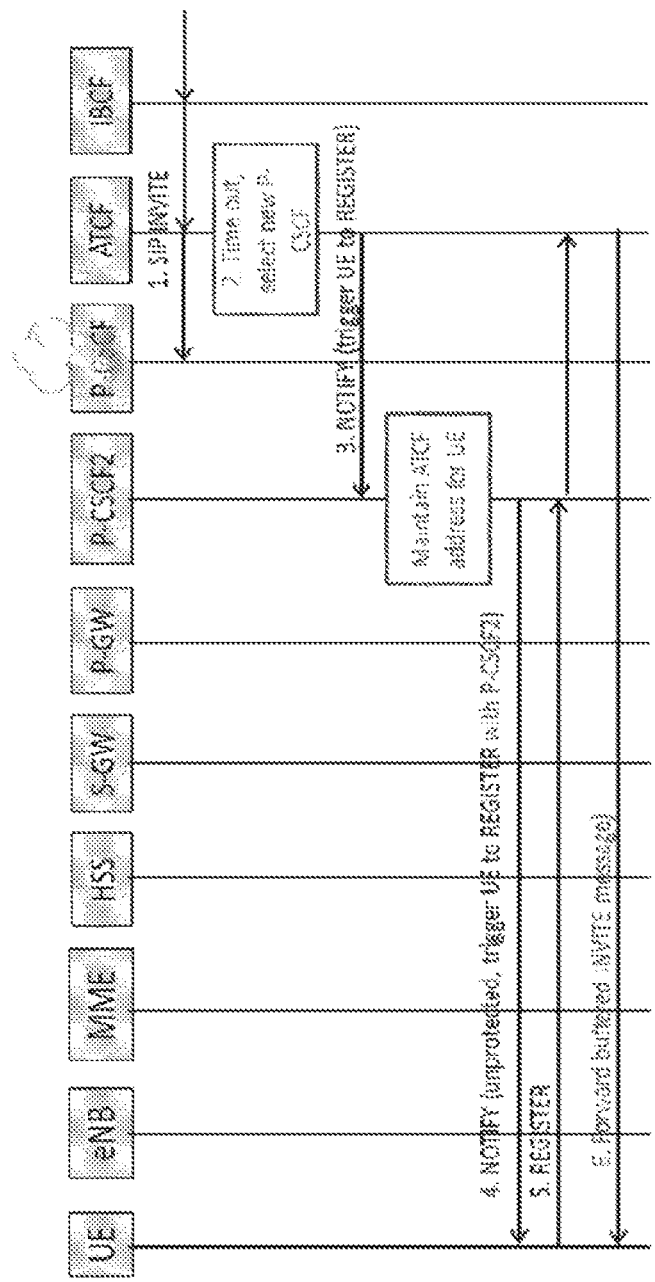
Fig. 4: P-CSCF Failure Detection by ATCF in VPLMN

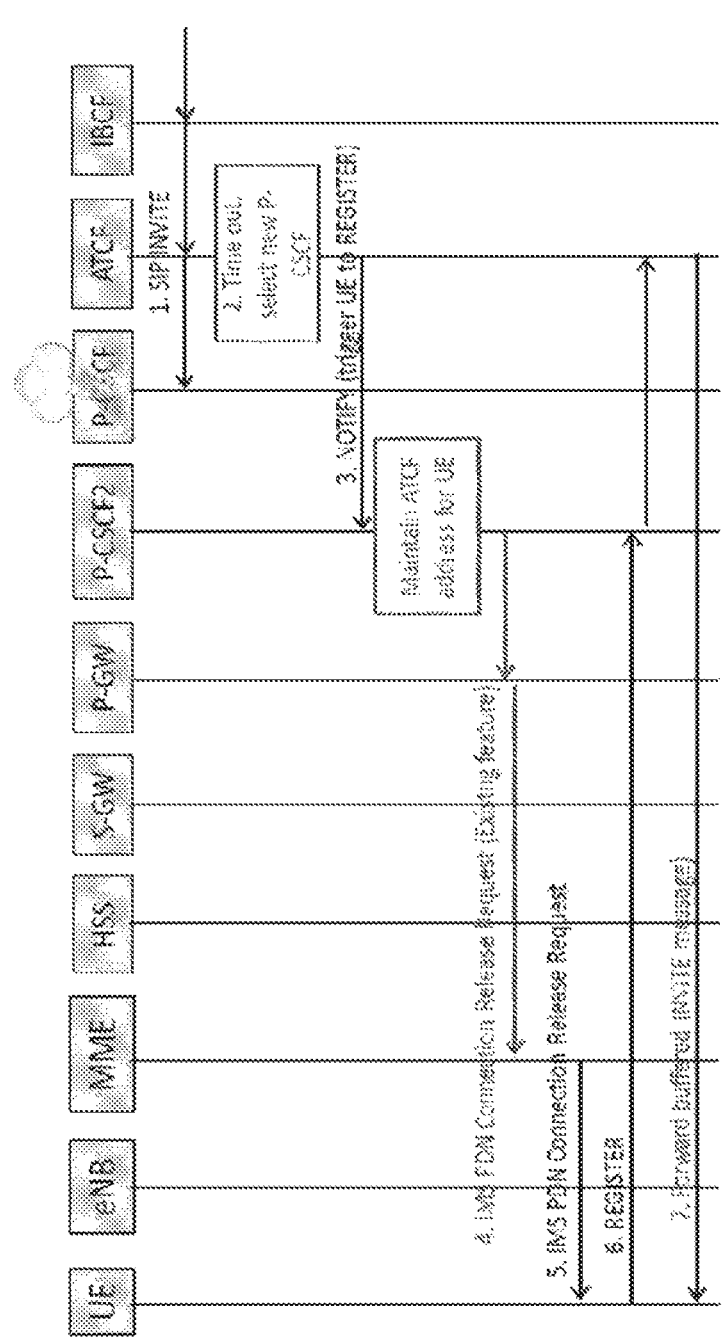
Fig. 5: P-CSCF Failure Detection by ATCF in VPLMN and retrieved by EPS

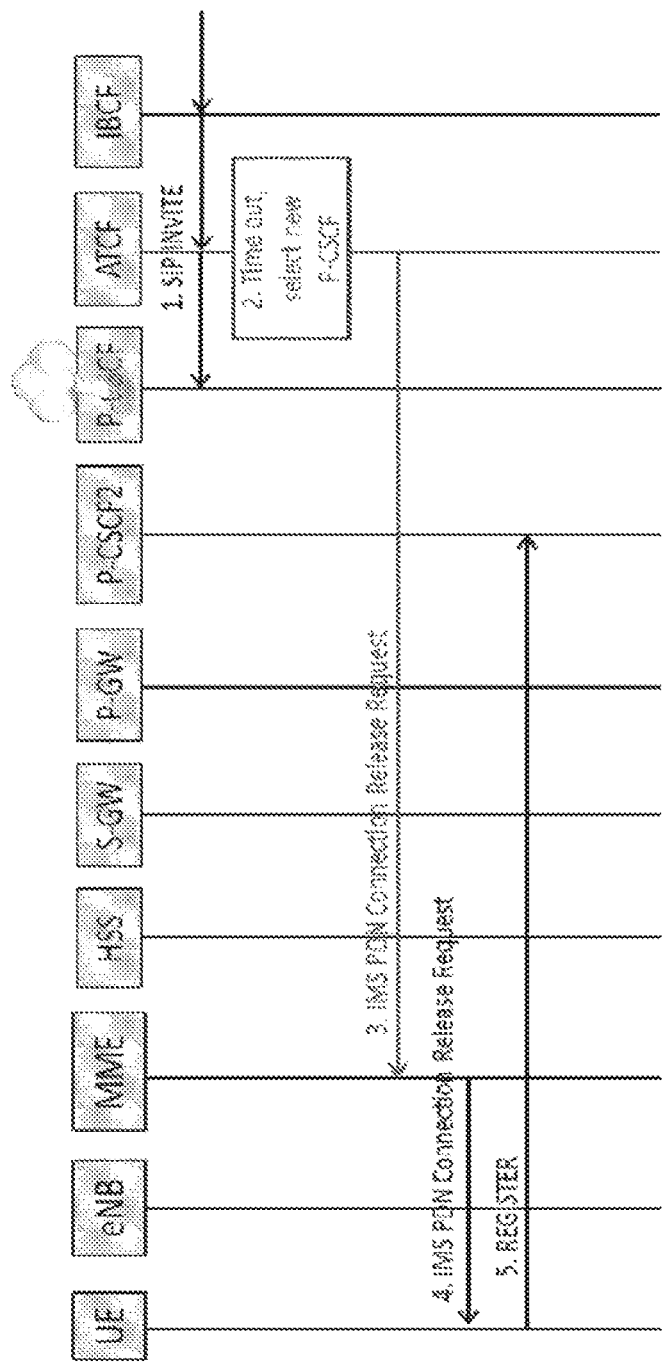
Fig. 6: P-CSCF Failure Detection by ATCF + MME in VPLMN

METHODS AND APPARATUSES FOR FACILITATING P-CSCF RESTORATION WHEN A P-CSCF FAILURE HAS OCCURRED

CROSS-REFERENCE TO RELATED PATENT APPLICATIONS

This application is a continuation of U.S. patent application Ser. No. 15/023,803, filed Mar. 22, 2016, which is a National Stage Entry of International Application No. PCT/GB2014/052906, filed Sep. 24, 2014, which claims the benefit of priority from European Patent Application No. 13185705.4, filed Sep. 24, 2013. The entire contents of the above-referenced applications are expressly incorporated herein by reference.

The present invention relates to a method of Proxy Call Session Control Function (P-CSCF) in a communication system and associated apparatus.

The IP Multimedia Subsystem (IMS) is specified by 3GPP TS 23.228 to enable IP-based multimedia services to be used by the UEs. The Proxy Call Session Control Function (P-CSCF) is the SIP peer from UE perspective, as the SIP signaling exchange is performed over encrypted communication between UE and P-CSCF. Thus, the P-CSCF stores UE security and IP session parameters. Further, P-CSCF authorizes the resources necessary for the IP session, remembers (from the registration process) the next hop CSCF for this UE.

The present invention targets the issue of failure of P-CSCF, which means loss of the UE's security and session parameters, and the P-CSCF restoration process.

Current standardized P-CSCF restoration procedures are based on the monitoring of the P-GW/GGSN on IP layer and in case of no response to the heartbeat messages, the P-GW/GGSN sends a new list of available P-CSCF addresses to all affected UEs to trigger new IMS registrations (to alternative P-CSCF).

Problems with Existing Solution:

Current limitations of this solution are the massive signalling for core and radio networks, since the R-GW/GGSN has to update a new list of available P-CSCFs addressed to every UE currently registered with the failing P-CSCF. Additionally then there are IMS re-registration attempts performed by every affected UE.

The current solution is not fully reliable, because in case of a P-CSCF partial failure (i.e. only for a set of users), the P-CSCF may appear available by the P-GW/GGSN, therefore restoration mechanism is not performed and terminating calls for affected users will fail. On the other hand a (temporary) network problem may cause the R-GW/GGSN to assume the P-CSCF is down and thereby trigger the restoration procedure unnecessarily.

The current problem has been investigated already in the contribution to 3GPP CT4 working group in document C4-131277 and a solution with a variant is described here. The proposal is depicted in the FIG. 1.

Method and System of P-CSCF Restoration

The solution is "re-active" in terms that the new P-CSCF determination is only executed when a terminating session request is arriving at the S-CSCF and the old P-CSCF cannot be reached or sends an error code. The error code is then provided back to the Application Server (AS) which is requesting an IMS PDN release to the HSS and further to the UE via the MME/SGSN so that the UE in a next step can reregister to IMS with selecting a new P-CSCF.

This "re-active" solution introduces a significant delay in a terminating call/connection establishment. Another considerable impact of this solution is the need to extend the HSS/HLR entity and the interface between HSS/HLR and MME should be enhanced.

BRIEF DESCRIPTIONS OF THE DRAWINGS

Aspects of the disclosure will now be described, by way of example, with reference to the accompanying drawings in which:

FIG. 1 illustrates schematically a cellular (tele) communication system to which aspects of the solution proposal from C4-131277 may be applied;

FIG. 2 is a timing diagram indicating exemplary Attach procedures for implementing some aspects of the present disclosure;

FIG. 3 is a timing diagram indicating exemplary P-CSCF Failure Detection procedures by PCRF for implementing some aspects of the present disclosure;

FIG. 4 is a timing diagram indicating exemplary P-CSCF Failure Detection procedures by ATCF in VPLMN for implementing some aspects of the present disclosure;

FIG. 5 is a timing diagram indicating exemplary P-CSCF Failure Detection procedures by ATCF in VPLMN for implementing some aspects of the present disclosure; and FIG. 6 is a timing diagram indicating exemplary P-CSCF Failure Detection procedures by ATCF and MME in VPLMN for implementing some aspects of the present disclosure.

DESCRIPTION OF INVENTION WITH EMBODIMENTS

Possible Solution

One possible solution is based on an extension to the prior-art solution shown in FIG. 1, as described below.

The proposed solution in FIG. 1 does not consider the case where the IMS PDN release request message (shown in message number 7) is not supported by the MME. Current specifications do not allow the HSS to send a release for a specific PDN connection. The HSS will only send an update to the MME in case the subscription has changed, e.g. due to a new contract with the subscriber.

Applied without further intelligence in HSS, this would not result in the desired behaviour. Above situation could happen particularly in roaming case, i.e. when the S-CSCF is located in the home network while the MME is located in the visited network. In this case, there is no way for the HSS to know whether this solution works or not, due to lack of support by the MME. Lacking knowledge of the MME capability by the HSS has significant disadvantage, since the Home operator cannot take any action other than responding the SIP error code to the calling party. If the HSS knows the associated MME's capability in advance, the home operator can take an alternative approach other than responding the SIP error code to calling party for terminating IMS call. For example, home operator might active an unregistered user handling. For example, terminating IMS calls can be redirected to the Voice mail system.

For this reason, the MME has to indicate its capability to support the above described procedure with a capability indication at the time of Attach and any further MME mobility events, i.e. the TAU update procedure or the RAU update procedure. FIG. 2 shows the Attach procedure according to 3GPP TS 23.401 with the following additions:

The message exchange as shown step 4 and step 5 are also applicable for the TAU update procedure or/and the RAU update procedure.

In step 4, when the MME sends the Update Location Request, it shall include a flag to indicate its P-CSCF Failure capability towards the HSS. The MME may be located in the visited network and may send the capability on a per UE basis.

In an optimization, if the HSS supports storing the MME capability not only on a per UE basis but on a MME basis, then only from time to time the capability of the MME has to be refreshed in the HSS. For that reason the HSS indicates this capability with including a P-CSCF Failure Capability per MME flag in the Update Location ACK. Then the MME knows it does not need to send for every UE at every Attach or relocation the flag to the HSS. The MME may still send the capability indication from time to time to refresh it in the HSS; this may be done based on a configured number of UE interactions, e.g. 100× Attach to the MME, 50× MME Relocations etc. or based on time, e.g. once for one attach per day etc.

Once the HSS understands the MME capability, then this information can be further transferred to the associated AS or S-CSCF for those of UEs who currently belong to such MME or SGSN. Then, the associated AS or S-CSCF can take an alternative action other than responding the SIP error code to the calling party for terminating IMS call if the associated P-CSCF seems to fail.

In one embodiment the HSS uses the "Insert Subscriber Data" procedure as illustrated in FIG. 5.3.9.2-1 of TS 23.401 to withdraw the PDN connection for IMS (by disallowing the corresponding APN); subsequently, if the UE is in ECM IDLE state and the ISR is not activated and if the subscription change no longer allows the PDN connection, the MME initiated PDN disconnection procedure in clause 5.10.3 of TS 23.401 is used to delete the concerned PDN connection. If the UE is in ECM IDLE state and the ISR is activated, this procedure is invoked at the next ECM IDLE to ECM CONNECTED transition.

As described in TS 23.401, FIG. 5.10.3-1, step 1b, the MME decides to release the PDN connection. The HSS then issues a new "Insert Subscriber Data" (using a short, configurable offset timer), which indicates that the IMS APN is allowed again. In this way, the UE is triggered to re-establish the IMS PDN connection.

In summary, the possible solution (proposed enhancements of the prior-art FIG. 1) describes a solution where the MME and HSS exchange information about the P-SCSF failure capability.

The first enhancement proposes to exchange the capability of the MME to support the P-CSCF failure scenario. If the MME does not support it and the HSS sends an IMS PDN release request, then this would be simply discarded and the MT session would time out at some point in time.

The second enhancement proposes to deactivate the IMS APN in the InsertSubscriberData from the HSS towards the MME to force the UE to release the IMS bearer and then to activate the IMS APN again towards the MME, so that the MME can MME initiate paging via Network Triggered Service Request procedure to reestablish the IMS bearer. This second enhancement would work if the MME is not capable of handling the IMS PDN connection release, but would take longer in time.

Further, the present invention proposes another embodiment than the solution as outlined in the FIG. 1. The key aspect of the following embodiments is that the P-CSCF failure recovery solution can be solely executed within the visited network. This aspect is very important in order to deploy the P-CSCF failure recovery solution to the market as quick as possible.

The present invention proposes several solutions which are described in the various embodiments. These solutions can be described as "pro-active" as the UE starts the configuration of new P-CSCF entity before an originating call or a terminating call are initiated. The advantage of such "pro-active" solution is that the originating/terminating call setup time is reduced and the user experience is improved.

In a first embodiment a solution is described where the P-CSCF is monitored on Diameter level or any other protocol by the PCRF. This monitoring can start once the UE registers to IMS and when the P-CSCF creates the binding with the PCRF for this session.

FIG. 3 describes the proposed solution in detail:

1. The PCRF detects when the P-CSCF does not respond to any requests (e.g. for maintenance purposes) and when the heartbeat between the two nodes is broken. Please note that between PCRF and P-CSCF a Diameter protocol is used for information exchange, so that Diameter protocol specific mechanisms can be used by the PCRF to detect the failure of the P-CSCF. Another option would be that there is security association between the two nodes and the mechanism for failure detection can be specific to the used security protocol. Since both nodes can be located in the visited network when a UE is roaming, the detection and failure indication stays in the visited network without involving the home network.

2. The PCRF informs the P-GW about the P-CSCF failure. This step can be done either per UE basis or per node basis. If it is done per UE basis and there is a huge number of UEs registered with failed P-CSCF, the PCRF may take measures to distribute in the time (i.e. to delay) the signaling to the UEs in order to avoid burst of signaling. In case the UE has never setup an IMS Session, then the PCRF may have interacted with the P-CSCF at time of IMS registration, e.g. in order to modify the default bearer in a IMS signaling bearer with QCI=5 etc.

In case this interaction did not take place, then the PCRF can only know the UEs that had setup an IMS session before and could inform the PGW accordingly. The PGW itself could create bindings between UE IP addresses and the P-CSCF IP addresses and would also be able to resolve which UEs are impacted by the failure of a specific P-CSCF.

This step is done either by conveying a new PCC rule to the P-GW or by subscribing to PCRF events and a new event trigger value "P-CSCF Failure" for the Event-Report-Indication AVP. The PCRF may set the Session- Release-Cause to a new cause PCSCF_FAILURE. It is possible to use also any other reason in the cause value or any other Diameter AVP.

3. The P-GW takes action to inform the UE about the P-CSCF failure. For example, one possibility is that the PGW sends with Protocol Configuration Options (PCO) a list of new P-CSCFs within a CreatePDPContextResponse/Create Bearer Request to the UE. If the PCRF informs P-CSCF failure per node basis and if there is a huge number of UEs registered with failed P-CSCF, the PGW may take measures to distribute in the time (i.e. to delay) the signaling to the UEs in order to avoid burst of signaling. In another alternative the PGW may indicate a delay time in the information (e.g.

PCO) to the UE in order to delay the UEs response. This is another way to distribute the signaling originated from the UEs.
4. The UEs acknowledge the request.
5. Upon receiving the new list of P-CSCFs, if the P-CSCF in use is missing, each UE performs an initial registration towards a new P-CSCF2.

One alternative to the above solution based on the enhanced PCO signaling from PGW to UE is that the PGW initiates bearer re-establishment procedure where the EPS bearer to the IMS AP N is deactivated and re-established from the UE.

Yet another alternative is described for the steps (3), (4) and (5). In this alternative, the PGW initiates PDN connection release procedure for the IMS connection (e.g. for the IMS Access Point Name, IMS APN) or a bearer release procedure for the IMS bearers. For example the cause for the PDN connection release procedure can be set up to "re-establish", so that the UE is informed to initiate a new IMS connection setup. During the new IMS connection establishment initiated by the UE, the network would assign a new P-CSCF or alternatively the UE would resolve a new P-CSCF during the P-CSCF FQDN resolution procedure. Finally, the UE establishes a new IMS PDN connection and connects to the new P-CSCF.

In summary, the first embodiment discloses the idea based on the monitoring of the failure-free P-CSCF functionality by the PCRF function. If the PCRF detects failure of the P-CSCF, the PCRF takes actions to inform the P-OW and correspondingly the UE to register with a new P-CSCF.

In another embodiment, the P-CSCF failure is recognized by the Access Transfer Control Function (ATCF) or any other close SIP node, e.g. in case of roaming it could be the session border controller e.g. the IBCF, but it could be also the S-CSCF or I-CSCF or the Application Server itself. This requires the ATCF to know other alternative P-CSCFs in the network. The ATCF can learn about the alternative P-CSCFs during the registration process, e.g. the P-CSCF includes a backup P-CSCF or a list of backup P-CSCFs in the requests from the UE to the network, or the P-CSCFs are configured on all backup P-CSCF nodes. If the ATCF is configured to perform P-CSCF load balancing, it already monitors the load of all P-CSCFs and therefore knows all P-CSCFs. The ATCF can do registration hiding and may ask the HSS to provide an additional authentication data set for local re-registration of the UE in case of P-CSCF failure. If normal registration is performed, i.e. the UE was not in registered state before and there is no P-CSCF failure, then the register messages shah be forwarded to the HSS in the home network. The ATCF and P-CSCF may be located in the visited network.

FIG. 4 describes more details to the solution of ATCF-based detection of P-CSCF failure:
1. When a mobile terminating SIP INVITE is arriving at the ATCF, then the P-CSCF in a failure situation may respond with an error code or a time out in the ATCF would let the ATCF detect that the P-CSCF is down. The ATCF stores the SIP request. Alternatively, the ATCF may detect the P-CSCF failure by a keep-alive-heartbeat-detection mechanism between the ATCF and the P-CSCF. This keep-alive-heartbeat-detection mechanism can be done by the SIP signaling method or other lower layer mechanism.
3. Once the ATCF detects the P-CSCF failure, it selects another appropriate P-CSCF. It may take the current load situations into account.
3. The ATCF sends preferably a SIP NOTIFY to the selected P-CSCF2 to trigger the UE to re-register to IMS towards the new P-CSCF2. The P-CSCF2 creates and stores the binding of the ATCF address and the UE address.
4. The P-CSCF2 forwards the NOTIFY to the UE without protection.
5. The UE re-registers to IMS towards the new P-CSCF2 to the ATCF. The ATCF may have authentication data from the HSS and may challenge the UE with a 401 unauthorized response. The UE would calculate the response to the challenge and send another REGISTER message, if this is OK, the ATCF will acknowledge the re-registration with a 200 OK.
6. The ATCF forwards the stored SIP INVITE to the UE.

In another embodiment, illustrated in FIG. 5, the ATCF (or IBCF, I-CSCF, S-CSCF, AS) detects the P-CSCF failure as described in the FIG. 4. The only difference is the conveying of the re-registration request to the UE by an IMS PDN Connection Release, i.e. steps 1-3 as well as steps 6-7 are executed as described in FIG. 4.
4. Once the P-CSCF2 receives the NOTIFY from the ATCF, The P-CSCF failure is informed to the associated P-GW. Alternatively the P-CSCF failure is informed to the associated PCRF. In this case, the PCRF informs it to associated P-GW as the same way as described in FIG. 3 step 2. The P-GW then creates an IMS PDN Connection Release Request and sends it to the MME via the S-GW. The IMS PDN Connection Release may be a Delete Bearer Request Message and the MME may detect that the request is for the IMS bearer.
5. The MME sends the IMS PDN Connection Release Request to the UE with Cause value "Reactivation requested".

In another embodiment, illustrated in FIG. 6, the ATCF (or IBCF, I-CSCF, S-CSCF, AS) detects the P-CSCF failure as described in the FIG. 4. The main difference is in the conveying of the IMS PDN Connection Release to the MME. In this embodiment it is assumed that the ATCF and the MME are located in the same network, e.g. the visited network in case of roaming. With a new interface both nodes are connected. The Interface may be based on MAP, DIAMETER, SIP or any other suitable protocol. The ATCF is configured with the MME address. It may learn the address during the IMS registration and the HSS may include the serving node information in the answer messages towards the UE. The ATCF may remove this information once the message passes through on the way to the UE.

The problem of the solutions based on the ATCF detection of P-CSCF failure is that ATCF Is an optional entity which is mainly applied for roaming UEs. With other words, in case of non-roaming UE, the ATCF may not be used. Therefore the proposed solutions are mainly applicable to P-CSCF restoration for roaming UEs. In case of non-roaming the I-CSCF, S-CSCF or AS may be used for SIP monitoring of the P-CSCF. Further the solution described in FIG. 3 can be applied as well for non-roaming UEs.

All methods in the embodiments above can be applied to multiple SIP nodes such as I-CSCF, S-CSCF, IBCF, ATCF, AS or any other IMS signaling node.

Inventive Steps of the Invention Together with Embodiments
1) Conveying of the P-CSCF Failure Handling capability of the MME to the HSS.

2) Alternatively, Deactivation/Activation of the IMS APN from the HSS to the MME with changing the subscription information.
3) Alternatively, Monitoring of the P-CSCF on Diameter layer from the PCRF.
4) Alternatively, Monitoring of the P-CSCF on SIP layer from the ATCF, IBCF, I-CSCF, S-CSCF or AS.
5) Alternatively, Local failure handling by reselecting the P-CSCF and keeping the re-registration locally only up to the ATCF or IBCF in the VPLMN.
6) Alternatively, Direct conveying of P-CSCF failure to the MME from the ATCF or IBCF.

Important Aspects of the Invention Together with Embodiments

The key features of the inventions are:
1) Decision in the HSS how to address the IMS PDN Connection based on the capability of the MME, which may reside in the VPLMN.
   a. Sending a IMS PDN Connection Release (MME supports it).
   b. Deactivate and activate subscriber profile parameter for the IMS APN (MME does not support it).
2) Monitoring of the P-CSCF on Diameter layer from the PCRF and in case of failure sending a new event trigger value "P-CSCF Failure" for the Event-Report-Indication AVP. The PCRF may set the Session-Release-Cause to a new cause PCSCF_FAILURE.
3) Monitoring of the P-CSCF on SIP layer from the ATCF, IBCF, I-CSCF, S-CSCF or AS and selecting a new P-CSCF for further session handling.
4) The new P-CSCF stores the binding between UE and ATCF (and/or IBCF/I-CSCF/S-CSCF/AS) and
   a. Sends an unprotected NOTIFY to the UE to trigger the IMS re-registration.
   b. Informs the PCRF which sends a new event trigger value "P-CSCF Failure" for the Event-Report-Indication AVP. The PCRF may set the Session-Release-Cause to a new cause PCSCF_FAILURE.
5) Direct conveying of P-CSCF failure to the MME from the ATCF or IBCF with a new interface based on MAP, DIAMETER, SIP or any other suitable protocol.

Advantages of the Invention Together with Embodiments

Optimization for roaming subscribers, local failure handling without home network impact. Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the invention. Although specific terms are employed herein, they are used in a generic and descriptive sense only and not for purposes of limitation.

The invention claimed is:

1. A method, performed by a server for subscription data, the method comprising:
receiving support information from a core network node for mobility management to indicate whether the core network node supports restoration of a Proxy Call Session Control Function (P-CSCF);
identifying whether the core network node supports the restoration of the P-CSCF based on the support information;
receiving an indication of a P-CSCF restoration in a case where the P-CSCF has failed; and
indicating the indication of the P-CSCF restoration to the core network node to cause the core network node to release an Internet Protocol (IP) multimedia subsystem (IMS) connection of a corresponding user equipment (UE).

2. The method according to claim 1, wherein the support information is provided in an Update Location Request (ULR) message.

3. The method according to claim 1, further comprising: storing the support information.

4. The method according to claim 3, wherein the storing comprises storing the support information per core network node for a communication system having a plurality of core network nodes.

5. A method, performed by a core network node for mobility management for facilitating restoration of a Proxy Call Session Control Function (P-CSCF), the method comprising:
providing, to a server for subscription data, support information to indicate that the core network node supports the restoration of the P-CSCF;
receiving an indication of a P-CSCF restoration from the server for subscription data in a case where the P-CSCF has failed; and
releasing an Internet Protocol (IP) multimedia subsystem (IMS) connection of a corresponding user equipment (UE) in response to receiving the indication from the server for subscription data.

6. The method in accordance with claim 5, wherein the providing is performed by an Update Location Request (ULR) message.

7. A method, performed in a communication system, for facilitating restoration of a Proxy Call Session Control Function (P-CSCF) in an Internet Protocol (IP) multimedia subsystem (IMS), the method comprising:
providing, by a core network node for mobility management, support information for indicating the core network node supports the restoration of the P-CSCF to a server for subscription data;
receiving, by the server for subscription data, the support information from the core network node;
identifying, by the server for subscription data, the core network node supports the restoration of the P-CSCF based on the support information;
receiving, by the core network node, an indication of a P-CSCF restoration from the server for subscription data in a case where the P-CSCF has failed; and
releasing, by the core network node, an Internet Protocol (IP) multimedia subsystem (IMS) connection of a corresponding user equipment (UE) in response to receiving the indication from the server for subscription data.

8. A server for subscription data, comprising:
a memory storing instructions; and
at least one processor configured to process the instructions to:
receive support information from a core network node for mobility management to indicate whether the core network node supports restoration of a Proxy Call Session Control Function (P-CSCF),
identify whether the core network node supports the restoration of the P-CSCF based on the support information,
receive an indication of a P-CSCF restoration in a case where the P-CSCF has failed, and
indicate the indication of a P-CSCF restoration to the core network node to cause the core network node to release an Internet Protocol (IP) multimedia subsystem (IMS) connection of a corresponding user equipment (UE), wherein the P-CSCF has failed.

9. An apparatus for facilitating restoration of a Proxy Call Session Control Function (P-CSCF), comprising:
a core network node for mobility management including:
a memory storing instructions; and
at least one processor configured to process the instructions to:
provide, to a server for subscription data, support information to indicate that the core network node supports the restoration of the P-CSCF,
receive an indication of a P-CSCF restoration from the server for subscription data in a case where the P-CSCF has failed, and
release an Internet Protocol (IP) multimedia subsystem (IMS) connection of a corresponding user equipment (UE) in response to receiving the indication from the server for subscription data.

10. A communication system, for facilitating restoration of a Proxy Call Session Control Function (PCSCF) in an Internet Protocol (IP) multimedia subsystem (IMS), the communication system comprising:
a core network node for mobility management; and
a server for subscription data, wherein:
the core network node is configured to
provide support information for indicating the core network node supports the restoration of the P-CSCF to the server for subscription data,
the server for subscription data is configured to:
receive the support information from the core network node, and
identify whether the core network node supports the restoration of
the P-CSCF based on the support information, and
the core network node is further configured to:
receive an indication of a P-CSCF restoration from the server for subscription data in a case where the P-CSCF has failed, and
release an Internet Protocol (IP) multimedia subsystem (IMS) connection of a corresponding user equipment (UE) in response to receiving the indication from the server for subscription data.

* * * * *